United States Patent [19]

Tanita et al.

[11] Patent Number: 4,934,278

[45] Date of Patent: Jun. 19, 1990

[54] MOVING APPARATUS WITH TRACK RECESSED PORTION TO DISSIPATE DRIVE ROLLER CONTACT PRESSURE

[75] Inventors: Takeo Tanita, Kawasaki; Yusaku Azuma; Toshihiro Yamamoto, both of Yokohama; Masateru Yasuhara; Shozo Kasai, both of Kawasaki; Norio Nikaido, Tsuchiura, all of Japan

[73] Assignee: Canon Kabushiki Kaisha, Tokyo, Japan

[21] Appl. No.: 222,539

[22] Filed: Jul. 21, 1988

[30] Foreign Application Priority Data

Jul. 27, 1987 [JP] Japan .................. 62-113867[U]
Jul. 27, 1987 [JP] Japan .................. 62-113868[U]
Jul. 27, 1987 [JP] Japan .................. 62-113869[U]
Jul. 27, 1987 [JP] Japan .................. 62-113870

[51] Int. Cl.$^5$ .................. B61B 13/04; B61K 7/00; B61D 15/12
[52] U.S. Cl. .................. 104/119; 104/245; 104/250; 105/30; 414/749
[58] Field of Search .............. 105/30, 29.1, 144, 145; 104/119, 120, 132, 245, 249, 250, 98; 414/749

[56] References Cited

U.S. PATENT DOCUMENTS 3,437,053  4/1969  Bush et al. .................. 104/119
3,807,312  4/1974  Flodell .................. 105/30 X
4,207,821  6/1980  Beckert .................. 104/119

FOREIGN PATENT DOCUMENTS

58-54948   12/1983  Japan .
61-117043   6/1986  Japan .
61-230835  10/1986  Japan .
61-260957  11/1986  Japan .
63-132316   6/1988  Japan .
63-132317   6/1988  Japan .

Primary Examiner—Robert J. Oberleitner
Attorney, Agent, or Firm—Fitzpatrick, Cella, Harper & Scinto

[57] ABSTRACT

A displacing apparatus includes a moving table provided movably on a guide rail mounted on a fixed base. A guide bar is provided on the fixed base in parallel with the guide rail. The guide bar is formed with a recess. Also provided is a driving roller maintained in contact with the guide bar and driven by a driving source provided on the moving table for moving the moving table. A device is provided on the moving table for generating a contact pressure for maintaining the driving roller in pressure contact with the guide bar at a position on the guide bar opposite to the drive roller. A detector is also provided in relation to the moving table for detecting the position of the moving table. Finally, a device is provided for nullifying the contact pressure. The nullifying device drops the driving roller into the recess of the guide bar to nullify the contact pressure of the drive roller, the drive roller moving on the guide bar.

9 Claims, 11 Drawing Sheets

MOVING APPARATUS WITH TRACK RECESSED PORTION TO DISSIPATE DRIVE ROLLER CONTACT PRESSURE

BACKGROUND OF THE INVENTION

1. Field of the Invention

The present invention relates to a moving apparatus, and more particularly to a moving apparatus which is employed in an industrial robot or a numerically controlled working machine and for which a precise linear movement is required.

2. Related Background Art

Among the moving apparatus employed in such machines there are already known an apparatus for moving a rod member by supporting the rod member with plural friction rollers as disclosed in the Japanese Laid-open Patent No. 61-117043, and an apparatus utilizing a screw which is fitted with a nut member fixed to a movable member and rotating the screw to move the movable member along the screw.

As a feeding mechanism of a machine tool, the Japanese Patent Publication No. 58-54948 discloses an apparatus for friction driving a movable member with a friction roller along a guide bar. The patent discloses a feeding apparatus provided with a substrate, a guide face provided on the substrate, a movable member to be moved along the guide face, a feed drive device for moving the movable member along the guide face, a position detector for detecting the position of the movable member, and a control device for controlling the drive device in response to the signal from the position detector, which comprises providing the substrate with a friction plate for moving the movable member substantially parallel to the guide face, providing the movable member with plural driving rollers for contacting friction faces of the friction plate with equal forces on both sides, connecting at least one of the driving rollers with the feed driving device, wherein, if the friction faces of the friction plate is not parallel to the guide face, the movement of the movable member along the face applies a pressure to the friction plate through the driving rollers, and the friction plate is provided with a thin elastic portion so as to be elastically movable by the pressure in a direction perpendicular to the moving direction of the movable member and to have a high rigidity in the moving direction, and is positioned apart from the guide face so as to allow elastic deformation of the thin elastic portion between the friction plate and the guide plate.

Also the Japanese Laid-open Patent No. 61-230835 discloses a feeding apparatus for a machine tool, comprising a longitudinal guide rail provided over the feeding length on either of a fixed base of the machine or a movable member, a rolling unit composed of at least a pair of a driving roller and a pressure roller in rolling engagement with both sides of the guide rail, a motor for driving the driving roller through a flexible joint, pressure setting means incorporated in the rolling unit; and flexible connecting means for mounting the rolling unit on the movable member or the fixed base in slightly movable manner only in a direction perpendicular to the feeding direction, wherein the movable member is displaced by the normal and reverse rotation of the motor.

Furthermore the Japanese Laid-open Patent No. 61-260957 discloses a high precision feeding apparatus for supporting a feed rod under a necessary pressure between a small feed roller supported by a pair of back-up rollers and a pair of pressure rollers positioned opposite to the small feed roller and linearly moving the feed rod by rotating the small feed roller with a stepping motor, which comprises forming each of the back-up rollers with an integral structure of mutually separated plural plate-shaped rollers, and supporting the small feed roller with the back-up rollers in a state in which the plate-shaped rollers are mutually interlocking, whereby the diameter of the small feed roller is reduced without interference between the back-up rollers or between the back-up roller and the feed rod to achieve movement of a small amount.

SUMMARY OF THE INVENTION

A first object of the present invention is to prevent runaway of a movable member. The movable member of a robot or a machine tool is placed under a control of the timing of movement amount thereof and the speed thereof in accordance with a computer program for controlling such robot or machine tool.

In moving apparatus for linearly moving a movable member, the runaway of the movable member is generally prevented by defining the limits of movement in the program and constantly discriminating with a control circuit whether the movable member is or not within the limits and thereby stopping the movable member when either of the limits is exceeded, or by providing position sensors in the vicinity of the limit positions and thereby stopping the movable member when it is detected by either of the position sensors.

However, in the above-explained methods in which the control circuit identifies whether the movement is or not to be continued or whether the movable member is or not detected by a sensor, the preventing operation may not be conducted in time for example in the case where the movable member has a large inertia. Also such runaway is often induced by a failure in the control circuit, so that a proper instruction is not provided and there may result the destruction of the entire apparatus. Also in order to release the movable member mechanically from the driving force of the motor in the above-explained moving mechanism, there is required an expensive complex structure. Besides if the mechanical transmission between the servo motor and the screw is detached, the returning to the original point is not easy and requires time and a cumbersome procedure.

A second object of the present invention is to provide a moving apparatus for frictional drive with pressure contact rollers, provided with pressure adjusting means for separating and regulating the contact pressure of the pressure generating means, thereby releasing the guide bar from the pressure of the pressure rollers.

A third object of the present invention is to provide a moving apparatus for preventing the torsion of a guide bar, in the movement of a movable member by frictional drive of pressure roller in contact with the guide bar.

In a moving apparatus utilizing frictional drive, it is generally difficult to exactly define the relative positions of the driving roller and the pressure roller on the moving table, and there may often occur a situation where, for example, the guide bar is only in contact with the driving roller. Continuous operation in such a state will significantly reduce the service life of the guide bar, the driving roller and the pressure roller.

Figure 1:
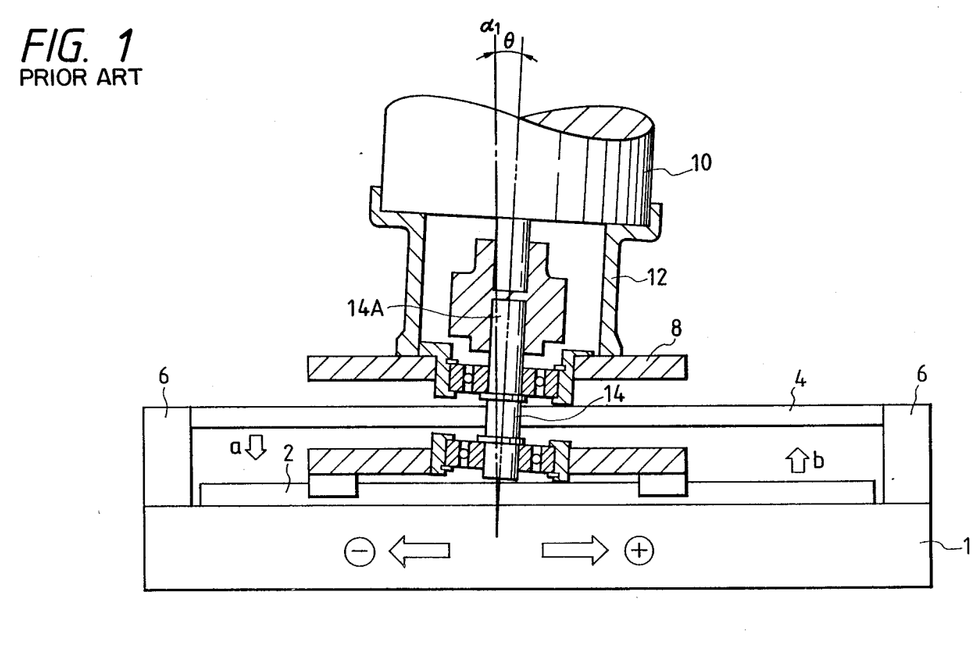
FIG. 1 is a schematic view of a moving apparatus by frictional drive, with an inclined driving roller shaft.

In FIG. 1, there are shown a fixed base 1; two guide rails 2 mounted on the fixed base 1 (only one rail being illustrated); a guide bar 4 fixed parallel to the guide rails 2 by means of fixing members 6 on the fixed base 1; a movable table 8 supported slidably on the guide rails 2; and a servo motor 10 mounted on the movable table 8 by means of a support member 12 for driving a driving roller 14.

The guide bar 4 is pinched between the driving roller 14 and an unrepresented pressure roller whereby the movable table 8 is moved at a high speed in a direction (+) or (−) by the rotation of the servo motor, but an eventual inclination angle θ induces a force to displace the guide bar 4 in a direction a or b, through the friction between the driving roller 14 and the guide bar 4.

Such inclination is principally generated by the presence of a heavy-weight servo motor 10 on the roller 14, or the supporting of the roller shaft 14A by the movable table 8 through a bearing, combined with certain play in the assembly. These phenomena result in a slippage between the roller 14 and the guide bar 4, thus inducing an excessive load on the servo motor 10.

As an example, in an apparatus with an inclination angle θ of 30′ and with a roller of 22 mm in diameter travelling over a distance of 500 mm, the guide bar 4 vertically moves as much as 4.36 mm if it is made freely movable in the vertical direction. Such movement gives rise to an error in the position of the roller 14 if the position is detected by the roller.

The above-mentioned object is achieved by a moving mechanism capable of realizing movement without slippage between the roller and the guide bar even when the driving roller has a certain inclination.

This object is achieved by a guide bar structure, in which the guide bar is provided, at both end positions, with portions of reduced cross section in which the cross section of the guide bar is symmetrically reduced in the vertical and horizontal direction, whereby the guide bar can absorb bending in the vertical and horizontal directions and torsion around the neutral axis thereof.

A fourth object of the present invention is to provide a moving apparatus capable of exact movement of a movable member by detecting the slippage of a roller for frictional drive and thereby adjusting or regulating the contact pressure of the roller.

Still another object of the present invention is to provide a moving apparatus in which the driving force of a motor is transmitted to a driving roller and a guide bar is pinched by the driving roller and a pressure roller, with a structure enabling easy assembling and easy repair and adjustment in case of a failure.

DETAILED DESCRIPTION OF THE PREFERRED EMBODIMENTS

In the following there will be explained a first embodiment of the present invention with reference to FIGS. 2 to 7.

Figure 2:
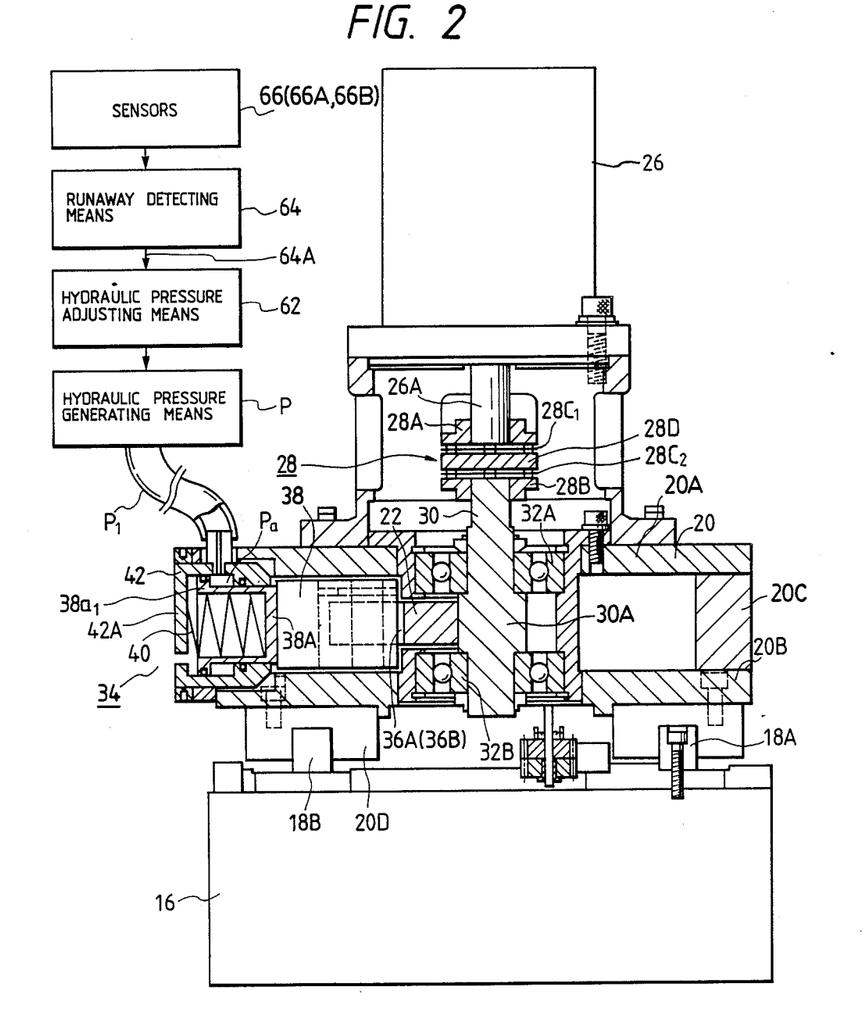
FIG. 2 is a partial cross-sectional view of a moving apparatus of the present invention.

There are shown a fixed base 16; first and second guide rails 18A, 18B fixed on the base 16 along the moving direction of a moving table 20; and a guide bar 22 supported by support members 24A, 24B (now shown) at the ends thereof above the upper face of the fixed base 16.

Figure 4:
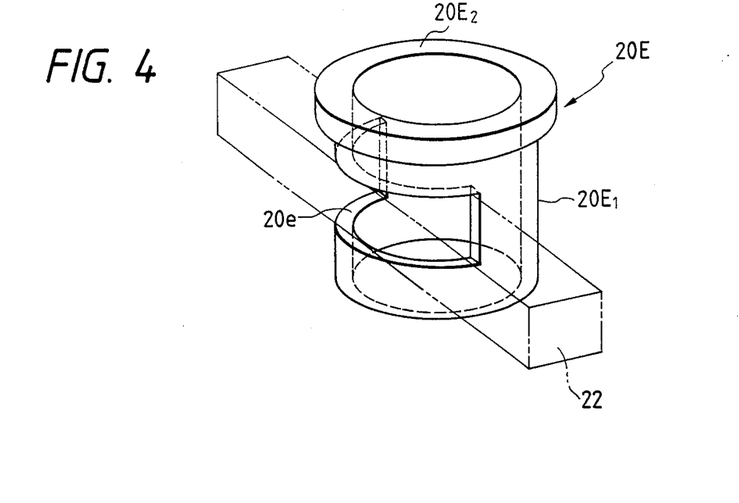
FIG. 4 is a schematic view of a housing 20E.
Figure 5:
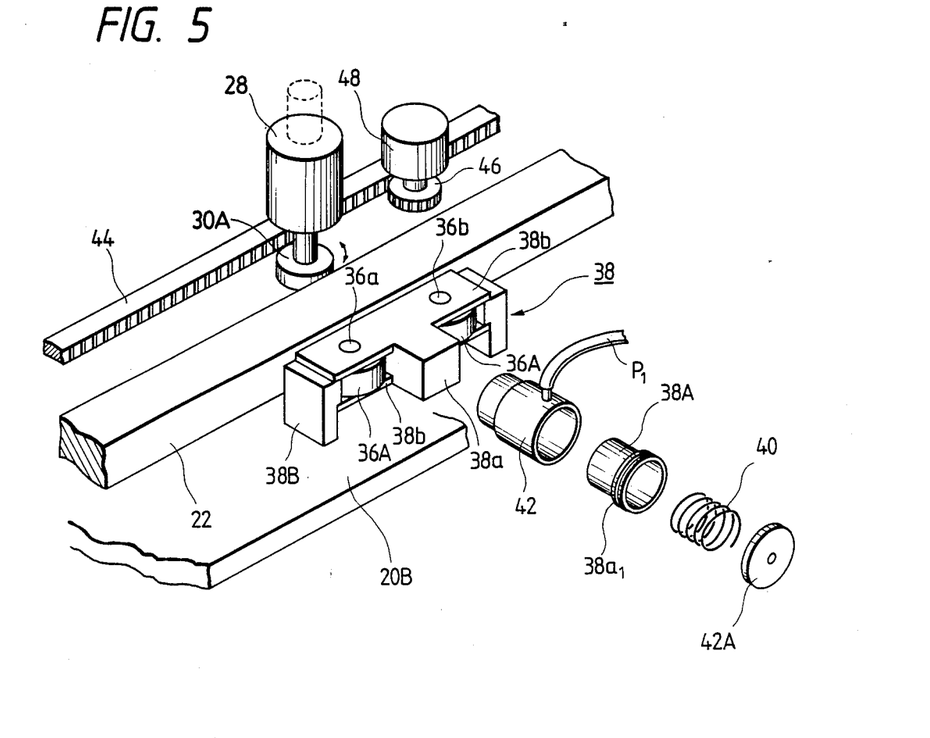
FIG. 5 is a schematic view showing the contact state of pressure rollers 36A, 36B.

The moving table 20 is composed of an upper plate 20A, a lower plate 20B, spaces 20C, 20C provided therebetween, sliding members 20D, 20D mounted under the lower plate 20B for engagement with the guide rails 18A, 18B, and a housing 20E for supporting a friction mechanism to be explained later. The housing 20E has a hollow cylindrical body $20E_1$ as shown in FIG. 4, with a lateral aperture 20e, and with an upper flange $20E_2$ for engaging with the upper plate 20A of the movable table. The housing 20E is, as shown in FIG. 2, fitted in apertures provided in the upper and lower plates 20A, 20B and fixed therein with screws.

A cylindrical motor support member 24 is fixed on the upper face of the upper plate 20A so as to engage with the flange $20E_2$ of the housing 20E and supports a servo motor 26 thereon.

An output shaft 26A of the motor 26 is positioned inside the support member 24 and is connected to a driving roller shaft through a flexible coupling member 28 to be explained later. The driving roller shaft 30 is rotatably supported by bearings 2A, 22B fitted inside the housing 20E, and constitutes, at the approximate center, a driving roller 30A in pressure contact with the guide bar 22.

Pressure contact means 34 is provided to maintain the pressure rollers 36A, 36B in contact with the guide bar 22. The pressure rollers 36A, 36B are made of metal material, for example iron or steel, and the rollers 36A, 36B are rotatably supported on roller shafts 36a, 36b respectively. The roller shafts 36a, 36b are attached to plate portions 38b, 38b, 38c, 38c, extending from the upper and lower portions of a block portion 38a, and the rollers 36A, 36B are embedded into center portions of the upper and lower plate portions. A roller support frame 38 is guided at both sides by guide members 38B attached to the lower plate 20B and is able to smoothly move only in one direction. The roller support frame 38 supporting the pressure rollers 36A, 36B is fitted between the upper and lower plates 20A, 20B of the moving table 20. The block portion 38a of the frame 38 is provided with a recess for accommodating a roller pressurizing spring 40 as shown in FIG. 2, and an opening portion of the recess is closed by a spring housing member 42, which is fixed to the upper plate 20A or lower plate 20B. As shown in FIG. 2, the guide bar 22 is in contact, at a running face thereof, with the driving roller 30A connected with the output shaft of the servo motor 26, and, at the other running face, with two pressure rollers 36A, 36B which are maintained in pressure contact with the guide bar by means of the force of the spring 40 received through the roller supporting frame 38 and a spring housing 38A. Consequently the driving roller 30A presses the running face of the guide bar with the contact pressure of the pressure rollers 36A, 36B. A hydraulic fluid (e.g. oil) pump P is connected through a pipe $P_1$ to a hole of the upper plate 20A. The external periphery of the aperture of the spring housing 38A is provided with a flange $38a_1$ which is fitted on the internal face of the spring housing member 42 to form an air-tight-chamber Pa, into which the hydraulic pressure from the pump P is introduced. The hydraulic pressure caused by the pump P in the air-tight chamber Pa biases the spring housing 38A in a direction to exert the spring force of the spring 40. Numeral 42A shows the cover member.

Figure 3:
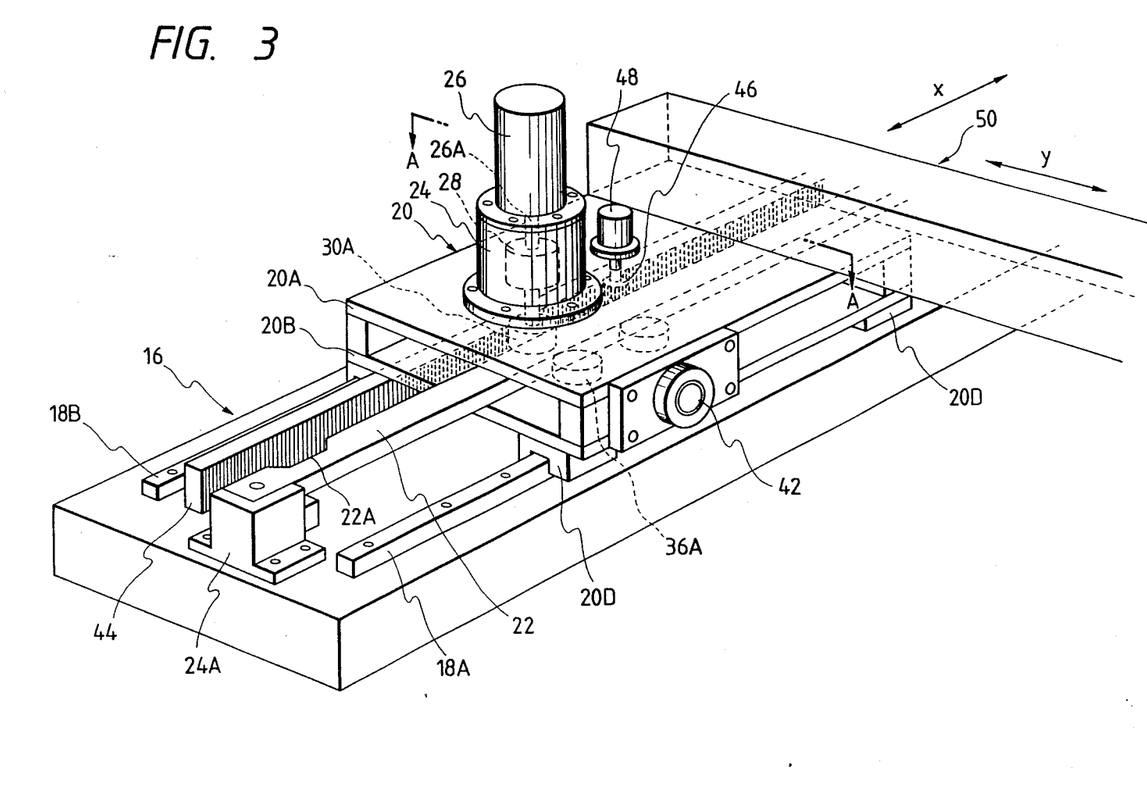
FIG. 3 is a partial perspective view of the moving apparatus.

In FIG. 3, a rack gear 44 is mounted on the fixed base 16, in a manner parallel to the guide bar 22. The rack gear 44 meshes with a pinion gear 46 which is connected to a first rotary encoder 48 mounted on the upper plate 20A of the moving table.

Also in FIG. 3, a robot arm 50 mounted on the moving table 20 supports an unrepresented robot arm movable in the y-direction on the arm.

Figure 6:
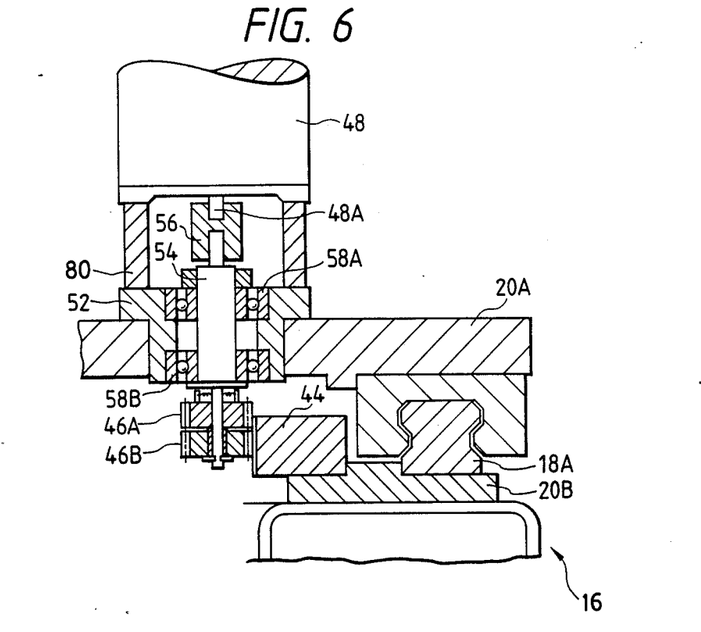
FIG. 6 is a cross-sectional view of the moving apparatus along a line A—A in FIG. 3.

FIG. 6 is a partial cross-sectional view of the mounting portion of the first rotary encoder shown in FIG. 3. The encoder 48 is mounted in a hollow cylindrical member 80, which is fixed on the upper plate 20A of the moving table through a bearing case 52. The case 52 is fitted in an aperture provided in the upper plate. The cylindrical member 50 accommodates a coupling of the output shaft 48A of the first encoder 48 and the pinion gear shaft 54.

Figure 7:
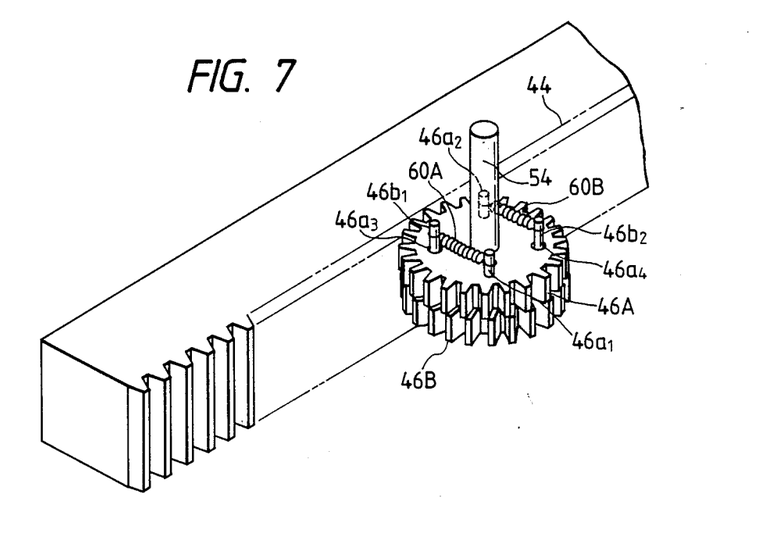
FIG. 7 is a schematic view of a rack and a pinion of a first encoder.

The pinion gear shaft 54 is rotatably supported by bearings 58A, 58B mounted on the case 52. On the lower end, of smaller diameter, of the gear shaft 54 there are mounted two pinion gears 46A, 46B, of which the upper one 46A is fixed on the smaller diameter portion of the gear shaft 54. The lower pinion gear 46B is superposed with the upper one 46A as shown in FIG. 7. The upper pinion gear 46A is provided with pins $46a_1$, $46a_2$ and holes $46a_3$, $46a_4$, and the lower pinion gear 46B is provided with pins $46b_1$, $46b_2$ penetrating through the holes $46a_3$, $46a_4$. Spring members 60A, 60B are respectively provided between pins $46a_1$, $46b_1$ and pins $46a_2$, $46b_2$. The structure of the pinion gear shown in FIG. 7 allows the device to eliminate the backlash in the meshing of the rack and pinion, and improve the detection precision of the rotary encoder.

In FIG. 3, a symbol 22A shown above the guide bar 22 indicates means for achieving the first object of the present invention. In the present embodiment, the symbol 22A indicates a recess formed in the guide bar 22, on a running face of the driving roller 30A.

In the structure shown in FIGS. 1 to 7, when the robot arm is moved along the x-direction of the guide bar 22 according to a control program of an unrepresented robot, the servo motor is driven by the control program to rotate the output shaft 26A, and the rotation is transmitted through the coupling 28A, 28B to the driving roller shaft 30.

In such moving mechanism, when the robot arm 30 is moved by the moving table 20, a reaction force F received by the driving roller 30A is determined by the acceleration $a$ and the mass m of the robot arm, and the driving roller has to withstand the reaction force F and to be maintained in a stage without slippage. More specifically the contact pressure P has to satisfy a relation:

$$P > \frac{F}{\mu} = \frac{ma}{\mu} \qquad (1)$$

wherein $\mu$ is the friction coefficient between the guide bar 22 and the driving roller 30A, and the force of the spring member 40 is determined accordingly.

In the present embodiment, the guide bar 22 is pinched between the driving roller 30A and the pressure rollers 36A, 36B with the above-explained contact pressure, and the robot arm 50 can be moved to a desired position through the moving table by rotating the driving roller 30A by the motor 26. Also the moved position can be determined by the meshing without backlash between the pinion gears linked to the encoder 48 and the rack gear, so that the robot arm 50 can be moved with positioning of high precision.

In may happen that the moving table 20 is not stopped at a predetermined position but moves to the end of the guide bar, due to a disorder in the control program of the robot or a failure in the driving circuit of the servo motor 26. In such situation, the driving roller 30A reaches the recess 22A formed on the running face of the guide bar, whereby the spring force of the spring 40 is released and the driving roller 30A and the guide bar 22 lose the contact pressure. Thus the moving table 20 loses the driving force and is therefore stopped.

In the foregoing embodiment, a recess is provided in the guide bar, but there may be employed other means instead of the recess for releasing the guide bar from the contact pressure of the driving roller, such as a separating member for separating the pressure rollers from the guide bar. The separating member may be positioned on a face of the fixing member for supporting the end of the guide bar, which face is met the pressure rollers, wherein the contact pressure of the driving roller is released when the pressure rollers rise on the separating member.

Though the foregoing embodiment is limited to the application to a linearly moving robot, the present invention is naturally applicable generally to an apparatus causing a relatively precise linear movement of a movable member such as a numerically controlled machine tool or a measuring instrument. Also the contact pressure of the pressure rollers, which is generated by a spring in the foregoing embodiment, may also be generated for example by air or oil pressure.

The adjustment of the contact pressure, which is the second object of the present invention, can be achieved in the following manner.

In FIG. 2, the hydraulic pressure generating means is connected to hydraulic pressure adjusting means 62, which is in turn connected to runaway detecting means 64.

The position of the moving table 20 is determined by a control program, and the moving table 20 is moved by the servo motor 26, and the position of the moving table is detected by the first encoder 48. In the normal operation, the servo motor 26 is stopped when the signal of the encoder 48 coincides with the signal of the target position. A runaway of the moving table is detected by the runaway detection means 64, composed for example of a proximity sensor, provided at a position beyond the running path of the guide bar 22. The detection signal 64A of the detection means 64 activates the hydraulic pressure adjusting means 62 to control the hydraulic pressure generating means P, thereby giving a pressure to the aforementioned air-tight chamber to move a spring housing 38A and to eliminate the spring force.

According to the second object of the present invention, it is possible to reduce mechanical shock, because the spring force is released by the hydraulic pressure, instead of the mechanical breaking in the first object. It is also possible to provide plural proximity sensors 66A, 66B, ... serially along the running path of the guide bar and to effect a first hydraulic pressure braking in response to the detection of the sensor 66A and a second hydraulic pressure braking in response to the detection of the sensor 66B. In this manner the moving table can be decelerated stepwise or linearly.

Figure 8:
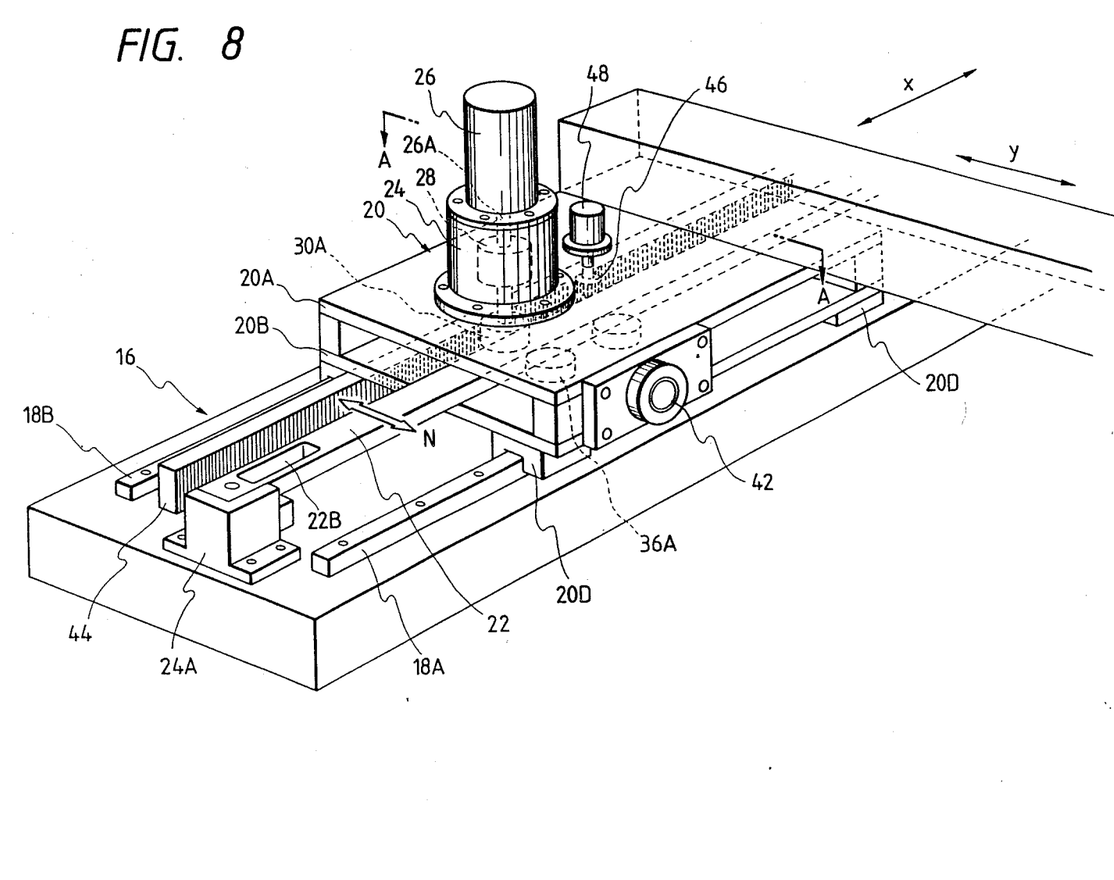
FIG. 8 is a perspective view of another embodiment.

FIG. 8 shows an embodiment for achieving the third object of the present invention, namely for resolving the torsion of the guide bar 22. It is to be noted that the present embodiment is same as that shown in FIG. 3, except for the structure of the guide bar. In the present embodiment, the guide bar is provided, at the both end portions thereof, with vertically penetrating holes of an oval or rectangular form 22B positioned along the center line of the guide bar, thereby allowing horizontal displacement thereof.

In the present embodiment, the guide bar 22 of square cross section is provided, at the end portions close to the end supporting positions, with penetrating holes 22B of an oval or rectangular form as shown in FIG. 8, so that two vertical beams remain on both sides of the hole, whereby the entire guide bar 22 is rendered more easily movable in the horizontal direction N in a range between the holes 22B.

Such a structure of the guide bar 22 enables the displacement of the entire guide bar 22 even if the driving roller and the pressure rollers are not in the proper position with respect to the guide bar due to, for example, an error in the assembly thereof, so that the guide bar can be maintained in a state easily pinched by the driving roller and the pressure rollers.

Figure 9A:
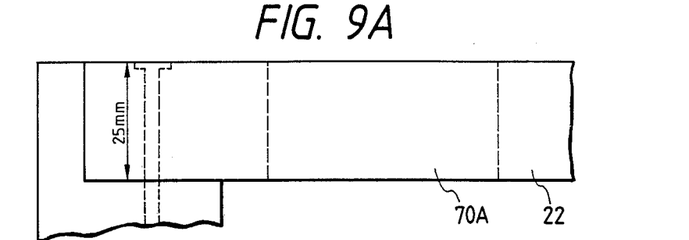
FIGS. 9A and 9B are schematic views of the apparatus shown in FIG. 8.
Figure 9B:
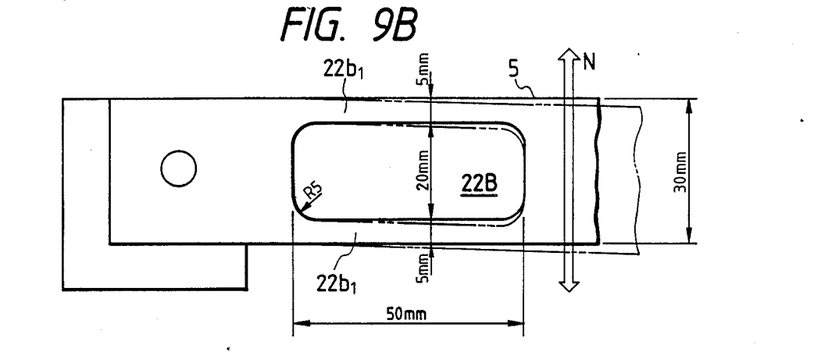

FIGS. 9A and 9B illustrate an example of the above-explained penetrating hole.

In this example, a guide bar of a thickness of 25 mm and a width of 30 mm is given a rectangular hole of $20 \times 50$ mm with rounded corners with a radius of R=5 mm, thus leaving beams $22b_1$ of a width of 5 mm and a thickness of 25 mm on both sides of the hole. Thus the entire guide bar is more easily subject to a deformation as indicated by chain lines.

Figure 10:
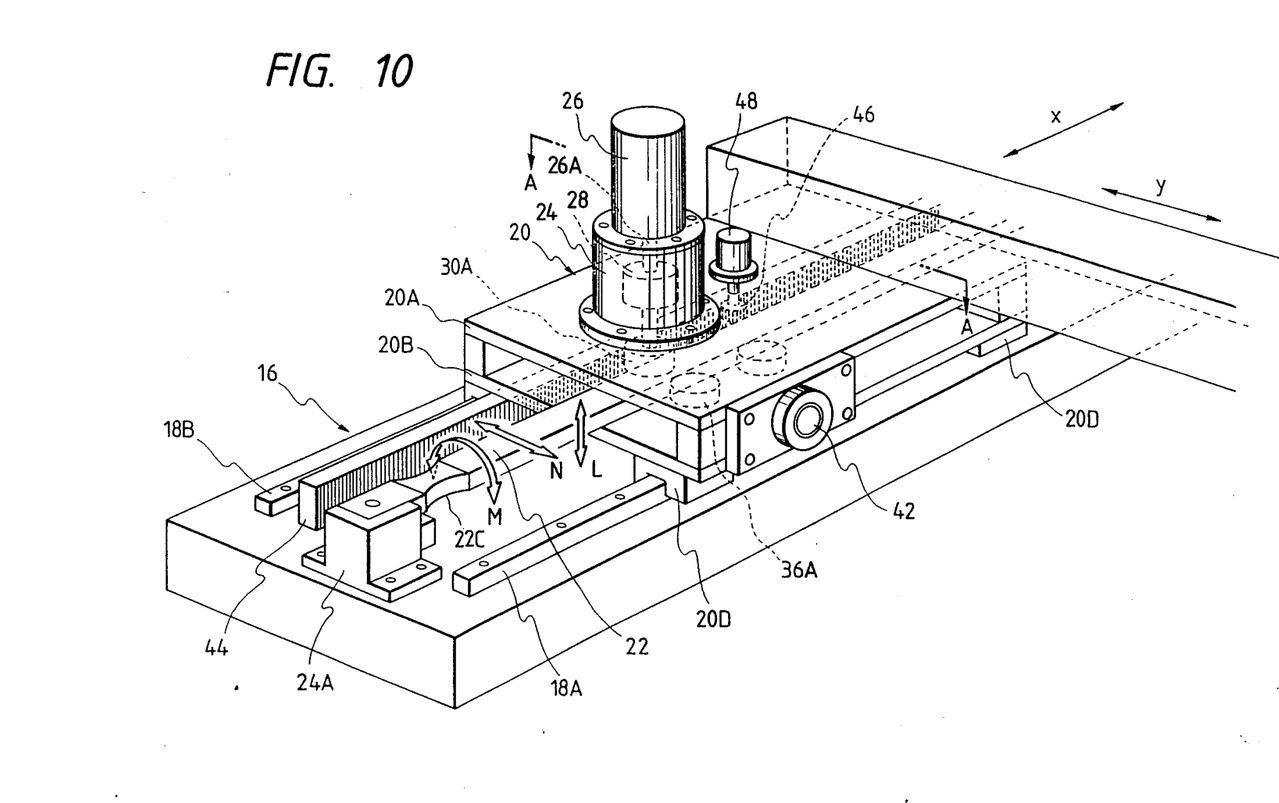
FIG. 10 is a schematic view of a reduced cross-section portion of the guide bar.

FIG. 10 illustrates an improvement for achieving the third object of the present invention. The structure shown in FIG. 10 is same as that shown in FIG. 3 except for the structure of the guide bar 22. In the present embodiment, the guide bar 22 is provided, at the both end positions, with portions of reduced cross section 22C in which the cross section of the guide bar is symmetrically reduced in the vertical and horizontal directions, thereby enabling bends of the guide bar in the horizontal and vertical directions and torsion of the guide bar around the neutral axis thereof.

In the present embodiment, the guide bar of a rectangular cross section is symmetrically scraped off from the four sides in positions close to the both ends, thereby forming portions 22C of smaller cross section and facilitating a vertical bend indicated by an arrow L, a horizontal bend indicated by an arrow N, and a torsion indicated by an arrow M around the neutral axis of the bar.

Therefore, even if the driving roller and the pressure rollers have certain positional errors in the assembly with respect to the guide bar 22, the guide bar 22 is more easily deformed by the presence of the portions 22C and remains in a state more easily pinched between the rollers.

Figure 11A:
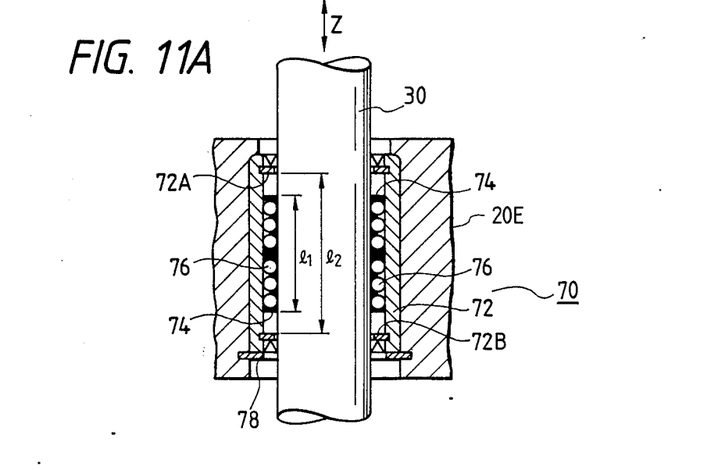
FIG. 11A is a schematic view of a bearing allowing axial movement of the driving roller shaft.

FIG. 11A illustrates a countermeasure in case that the driving roller shaft has a certain inclination angle $\theta$ as shown in FIG. 1.

Such inclination angle $\theta$ of the driving roller shaft, as shown in FIG. 1, tends to deform the guide bar in a direction a or b under the frictional force between the driving roller and the guide bar.

Such inclination is principally generated by the presence of a heavy servo motor on the roller, or the supporting of the roller shaft by the moving table through a bearing, combined with certain plays in the assembly. These phenomena result in slippage between the roller and the guide bar, thus inducing an excessive load on the servo motor.

As an example, in an apparatus with an inclination angle $\theta$ of 30' and with a roller of 22 mm in diameter travelling over a distance of 500 mm, the guide bar 4 vertically moves as much as 4.36 mm if it is made freely movable in the vertical direction. Such movement gives rise to an error in the position of the roller if the position is detected by the roller.

The present embodiment provides a moving mechanism capable of realizing movement without slippage between the roller and the guide bar even when the driving roller has a certain inclination angle.

More specifically the present embodiment is characterized by a fact that the driving roller shaft is provided with a shaft joint allowing an axial displacement of the driving roller and an inclination of the shaft, and a bearing member allowing axial displacement of the driving roller.

FIG. 11A illustrates an example of bearing member allowing axial displacement of the driving roller.

Figure 11B:
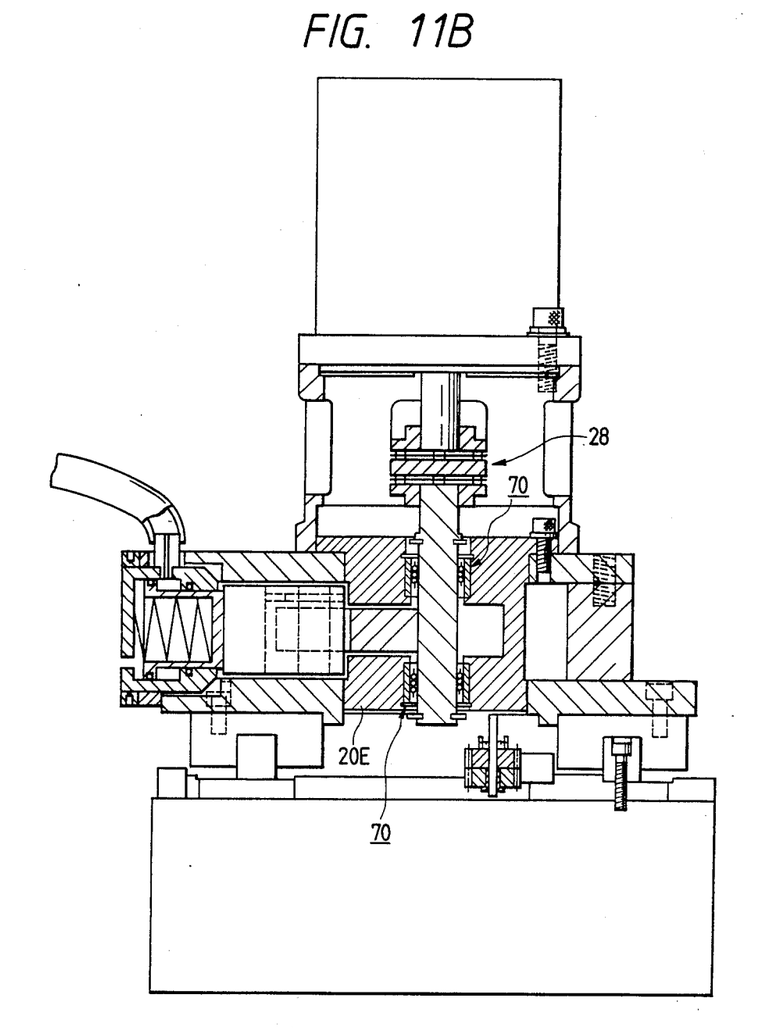
FIG. 11B is a partial cross-sectional view of the third moving apparatus using the bearing shown in FIG. 11A.

The bearing member 70 shown in FIG. 11A is employed in place of the bearing shown in FIG. 2. FIG. 11B shows the third moving apparatus using the bearing member 70.

In FIG. 11A there are shown a housing 20E, and a cylindrical bearing case 72 fitted in the housing 20E. In a space between the bearing case and the driving roller shaft 30 there are provided bearing balls 76 which are positioned so as to surround the roller shaft 30 in plural rows in the axial direction by a retainer 74. On both ends inside the case 72 there are fitted stoppers 72A, 72B for the retainer 74.

The length $l_1$ of the retainer 74 is smaller than the distance $l_2$ between the stoppers 72A, 72B, so that a space of a length of $l_1 - l_2 = \Delta l$ is formed. A C-ring 78 is used for mounting the case 72 in the housing 20E.

The bearing 70 shown in FIG. 11A allows the axial movement of the driving roller shaft 30 in the space when subjected to a force in a direction a, since the shaft if supported by the balls 76.

The coupling 28 shown in FIG. 2 and FIG. 11B is composed of a hub 28A fixed to the motor output shaft 26A, a hub 28B fixed to the driving roller shaft 30, two spring plates $28C_1$, $28C_2$ respectively fixed to the hubs 28A, 28B, a spacer 28D for connecting the spring plates, and washers and bolts for uniting the hubs, spring plates and spacer. The coupling can absorb the axial displacement of the driving roller shaft 30 by means of the spring plate 28C$_1$, 28C$_2$.

According to the present invention, the ball bearings 32A, 32B shown in FIG. 2 may be replaced by the bearing shown in FIG. 11A to enable axial displacement of the driving roller shaft 30 within the movable range of the retainer 74 in the bearing case 72, even if the driving roller shaft 30 is installed in the housing 20E with a certain inclination angle with respect to the guide bar 22, and the displacement of the driving roller shaft 30 is absorbed by the coupling 28 explained above.

Figure 12:
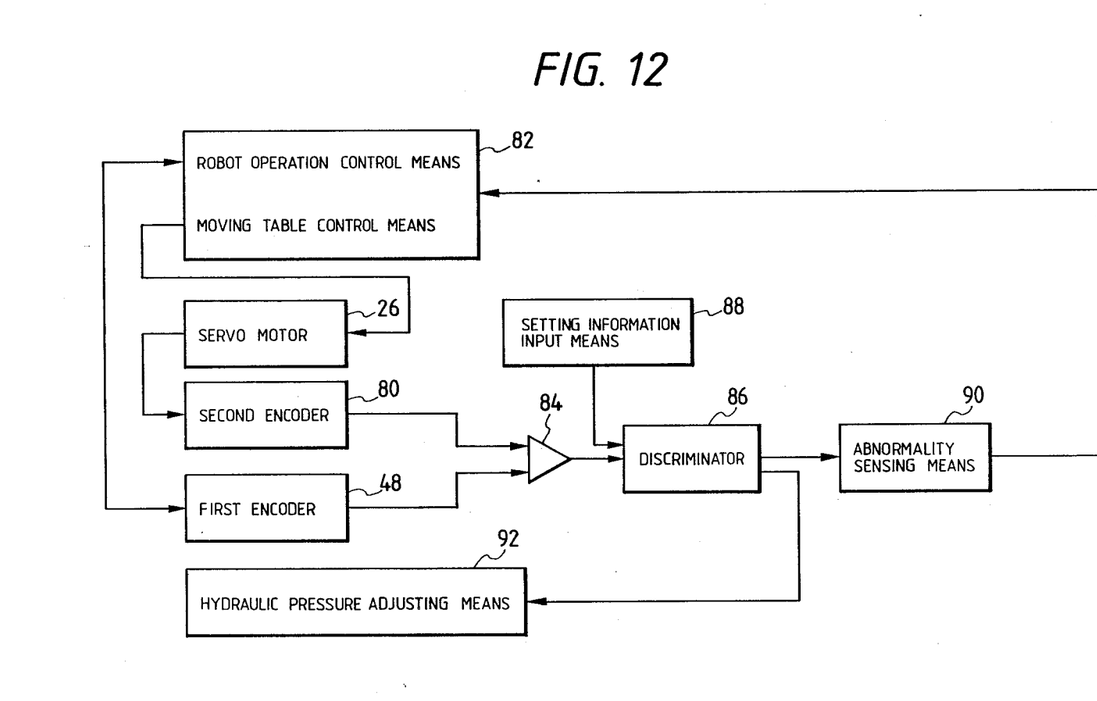
FIG. 12 is a block diagram for detecting the amount of slippage of the driving roller.
Figure 13:
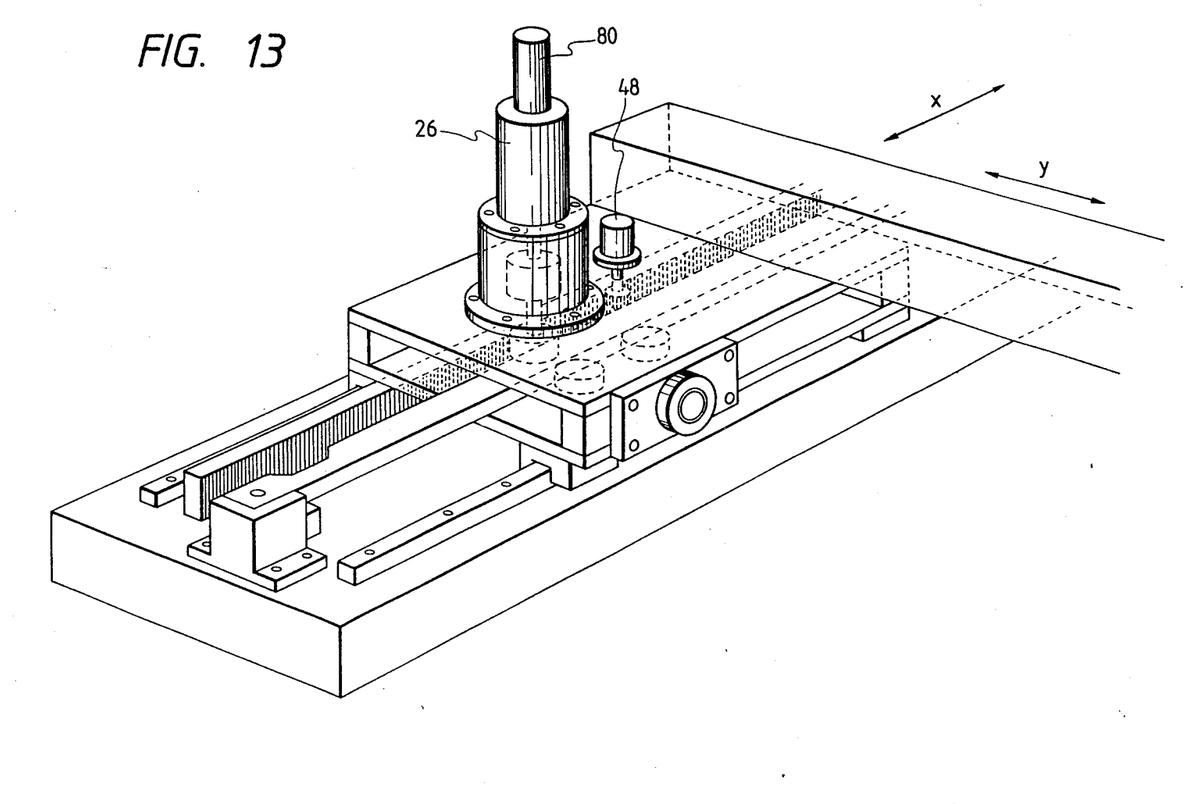
FIG. 13 is a schematic view of an apparatus for detecting the amount of slippage with first and second encoders.

FIGS. 12 and 13 illustrate an embodiment for achieving the fourth object of the present invention for preventing the slippage of the driving roller.

In the moving apparatus shown in FIG. 2, the driving roller may cause slippage at the contact surface with the guide bar, if the contact pressure of the pressure rollers 36A, 36B is too weak or if the rollers do not evenly contact the guide bar, and such slippage causes abrasion or irregular damages on the rollers, thus hindering smooth movement of the moving table.

In the present embodiment, the servo motor 26 is provided with a second encoder 80 to detect the level of slipping from the comparison of signals of the first and second encoders, and according to the level of slipping, the contact pressure is adjusted. Or if such adjusting is not possible, a detection signal is outputted indicating an abnormality state.

In FIG. 12, robot control means 82 contains a program for controlling the functions of various parts of the robot, such as robot arm, robot fingers etc., according to kinds of operation. The program also contains a program for controlling the movement of the moving table.

The control means 82 is connected to the first encoder 48, which detects the position of the moving table when it is moved by instructions from the control means and send detection signals thereto.

A second encoder 80 is connected to the servo motor 26 for driving the driving roller shaft 30 and detects the amount of rotation of the motor 26.

Comparator 84 compares the signals from the first and second encoders to output comparison information, which is discriminated by discriminator 86 based on setting informations from setting information input means 88. There are also provided abnormality sensing means 90, and hydraulic pressure adjusting means 92.

The structure shown in FIG. 13 is same as that shown in FIGS. 2 and 3, except for the presence of the second encoder 80.

In the following there will be explained the function of the embodiment shown in FIGS. 12 and 13. When the moving table 20 is moved according to the program of the control means 82, the driving roller 30A may cause slippage due to insufficient pressure contact between the driving roller 30A and the guide bar 22 if the spring force of the spring 40 shown in FIG. 2 is weak.

The amount of movement of the moving table 20 is controlled by the information from the control means 82, and the position of the moving table is detected by the first encoder 48. The second encoder 80 detects the amount of rotation of the servo motor. The outputs of the first and second encoders are identical in the absence of the slippage of the driving roller. In the presence of slippage, in order to move the moving table to the desired position by frictional drive involving such slippage, the servo motor 26 has to rotate in excess corresponding to the slippage, so that the second encoder 80 outputs a signal corresponding to the sum of the theoretical rotation and rotation of the slippage. The amount of slippage can be determined by comparing the outputs of the first and second encoders by the comparator 84. The information obtained from the comparator 84 is compared, in a discriminator 86, with a signal from present input means 88 to determine whether the information as an amount of slippage is adequate or not to be given.

More specifically, the amount of slippage of the driving roller 30A on the guide bar is undesirable beyond a certain limit, but is negligible below the limit. Consequently the discriminator 86 discriminates the amount of slippage, and if the amount exceeds an appropriate level, the discriminator sends a signal to the abnormality sensing means 90 to detect an abnormal state, thereby causing the robot operation control means 82 to terminate the movement of the moving table.

If the amount of slippage is small, the signal from the discriminator 86 is supplied to the hydraulic pressure sensing means 92 to regulate the hydraulic pressure of the hydraulic pressure generating means P shown in FIG. 2, thereby adjusting the pressure of the spring 40 and correcting the amount of slippage of the driving roller.

As explained in the foregoing, the present embodiment is featured by detecting the amount of slippage of the driving roller, discriminating whether the amount is appropriate or not, and identifying an abnormality in the moving apparatus or regulating the contact pressure by the hydraulic pressure regulating means on the basis of the result of the discrimination. The application of the present embodiment in a moving apparatus allows the apparatus to prevent abrasion of the driving roller, to prevent uneven contact of the rollers and to automatically adjust the contact pressure in case of roller slippage.

In the following, there will be explained a fifth object of the present invention.

A moving apparatus is designed to frictionally drive a moving table supporting a robot arm, as shown in FIGS. 2 and 3, with transmitting the rotation of the motor 26 to the driving roller shaft 30 and maintaining the roller 30A of the shaft 30 in pressure contact with the guide bar 22 by means of the pressure contact means. The driving roller shaft 30 of the apparatus is connected to the motor 26 through the coupling 28. The longitudinal guide bar 22 is supported at both ends. The contact between the guide bar and the driving rollers is made only in a point or a small area, when seen longitudinally, and is therefore unstable. The present embodiment is to achieve structural stability and ease in assembling of the upper and lower plates of the moving table and of the driving roller through an improvement in the aforementioned housing 20E.

In the structure shown in FIG. 2, the driving roller shaft 30 is rotatably supported, by means of the bearings 32A, 32B, in the housing 20E, which is fitted in and fixed to the apertures of the upper and lower plates. It is therefore possible to use the housing 20E, bearing 32A, 32B and driving roller shaft as a first unit in the assembling process, and to mount thus assembled housing to the moving table. It is therefore rendered possible to maintain a high precision in the assembling of the housing unit and to easily adjust the contact between the driving roller shaft and the guide bar.

What is claimed is:

1. A displacing apparatus comprising:
a moving table provided movably on a guide rail mounted on a fixed base;
a guide bar provided on the fixed base in parallel with the guide rail, said guide bar being formed with a recess;
a driving roller maintained in contact with said guide bar and driven by a driving source provided on said moving table for moving said moving table;
means provided on said moving table for generating a contact pressure for maintaining said driving roller in pressure contact with said guide bar at a position on said guide bar opposite to said driving roller;
means provided in relation to said moving table for detecting the position of said moving table; and
means for nullifying the contact pressure, said nullifying means dropping said driving roller into the recess of said guide bar to nullify the contact pressure of said driving roller, said driving roller moving on said guide bar.

2. A displacing apparatus comprising:
a moving table provided movably on a guide rail mounted on a fixed base;
a driving roller maintained in pressure contact with a guide bar provided on said fixed base in, parallel with said guide rail and driven by a driving source provided on said moving table for moving said moving table;
means provided on said moving table for generating a contact pressure for maintaining said driving roller in pressure contact with said guide bar at a position on said guide bar opposite to said driving roller; and
a cylindrical housing mounted on said moving table, incorporating a bearing which rotatably supports said driving roller, and provided with an aperture along the periphery thereof;
wherein said driving roller is maintained in contact with said guide bar through said aperture of the housing, and said contact pressure of the driving roller is generated by causing said guide bar to press said contact pressure generating means.

3. A displacing apparatus comprising:
a moving table provided movably on a guide rail mounted on a fixed base;
a driving roller maintained in pressure contact with a guide bar provided on the fixed base, in parallel with the guide rail, sand driven by a driving source provided on said moving table for moving said moving table;
means provided on said moving table for generating a contact pressure for maintaining said driving roller in contact with the guide bar; and
means provided on the guide bar for enabling torsion of the guide bar;
wherein said torsion enabling means is composed of portions of reduced cross section formed on the guide bar.

4. A displacing apparatus comprising:
a moving table provided movably on a guide rail mounted on a fixed base;
a guide bar of rectangular cross section, fixed at both ends to said fixed base and positioned in a space in a parallel manner to said guide rail;
a driving roller maintained in pressure contact with a lateral face of said guide bar and driving by a driving source provided on said moving table for moving said moving table; and
pressure rollers pinching said guide bar in cooperation with said driving roller to generate a contact pressure of said driving roller on said guide bar;
wherein said guide bar is provided, at positions close to both ends thereof, with a vertically penetrating hole of rectangular shape positioned along the central axis of said guide bar, thereby enabling deformation of said guide bar in the horizontal direction.

5. A displacing apparatus comprising:
a moving table provided movably on a guide rail mounted on a fixed base;
a driving roller supported by said moving table and driven by a driving source provided on said moving table;
a guide bar positioned on the fixed base in a parallel manner with the guide rail and maintained in contact with said driving roller;
plural pressure rollers supported by said moving table and maintained in pressure contact with said guide bar at a position on said guide bar opposite to said driving roller;
contact pressure generating means for providing said pressure rollers with a contact pressure;
detecting means provided in relation to said moving table for detecting a position to which said moving table is displaced, said detecting means outputting a signal when said moving table deviates from a predetermined path of the guide rail; and
contact pressure regulating means for regulating the contact pressure of said contact pressure generating means in accordance with the signal from said detecting means.

6. A displacing apparatus comprising:
a guide member having a running path for a moving member;
a motor for driving the moving member;
a driving roller connected with said motor and maintained in friction contact with said guide member;
means for detecting an amount of slippage of said driving roller; and
contact pressure regulating means for regulating the contact pressure of said driving roller according to said amount of slippage in response to a signal from said detecting means.

7. A displacing apparatus comprising:
a guide member having a running path for a moving member;
a motor for driving the moving member;
a driving roller connected to said motor and maintained in friction contact with said guide member;
means for detecting an amount of slippage of said driving roller; and
contact pressure regulating means for regulating the contact pressure of said driving roller according to the amount of slippage, in response to a signal from said detecting means,
said slippage amount detecting means comprising:
a first encoder for detecting the position of the moving member;
a second encoder for detecting the amount of rotation of said motor;
comparator means for comparing the output signals of said first and second encoders and determining the amount of slippage from the result of said comparison; and
means for receiving the output of said comparator means and determining whether the amount of slippage is within a predetermined tolerance.

8. A displacing apparatus comprising:

a moving table provided movably on a guide rail mounted on a fixed base;

a driving roller supported by said moving table and driven by a driving source provided on said moving table;

a guide bar positioned on the fixed base in a parallel manner to the guide rail and maintained in contact with said driving roller;

plural pressure rollers supported by said moving table and maintained in pressure contact with said guide bar at a position on said guide bar opposite to said driving roller;

contact pressure generating means for providing said pressure rollers with a contact pressure;

detecting means provided in relation to said moving table for detecting a position to which said moving table is displaced, said detecting means outputting a signal when said moving table deviates from a predetermined path of the guide rail;

contact pressure regulating means for regulating the contact pressure of said contact pressure generating means in accordance with the signal from said detecting means; and means, comprising a recess formed on said guide bar, for nullifying the contact pressure of said driving roller.

9. A displacing apparatus according to claim 8, wherein said contact pressure generating means comprises:

a block portion holding said driving roller and having a recess therein; and a spring housing provided in a recess formed in said block portion, said spring housing receiving a spring member for pressing said guide roller onto said guide bar, said spring housing being formed as an air-tight chamber, and said air-tight chamber being connected to said contact pressure generating means.

* * * * *

UNITED STATES PATENT AND TRADEMARK OFFICE
CERTIFICATE OF CORRECTION

PATENT NO. : 4,934,278
DATED : June 19, 1990
INVENTOR(S) : Tanita, et al.

It is certified that error appears in the above-identified patent and that said Letters Patent is hereby corrected as shown below:

ON TITLE PAGE:

[30] Foreign Application Priority Data:

Line 5, insert the following:

```
--June 20, 1988  [JP]  Japan ...... 63-80568
  June 20, 1988  [JP]  Japan ...... 63-80569
  June 20, 1988  [JP]  Japan ...... 63-80570
  June 20, 1988  [JP]  Japan ...... 63-80571
  July  6, 1988  [JP]  Japan ...... 63-169388--.
```

COLUMN 4:

Line 45, "bearings 2A," should read --bearings 22A,--.

COLUMN 11:

Line 48, "sand driven" should read --and driven--.

Signed and Sealed this

Thirty-first Day of March, 1992

Attest:

HARRY F. MANBECK, JR.

*Attesting Officer*  *Commissioner of Patents and Trademarks*